United States Patent Office 3,464,056
Patented Aug. 26, 1969

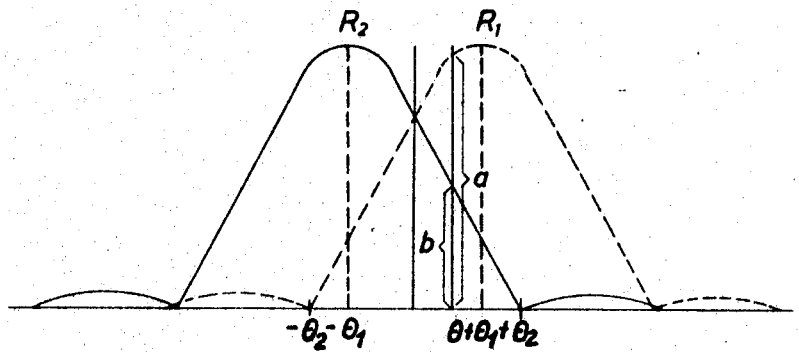
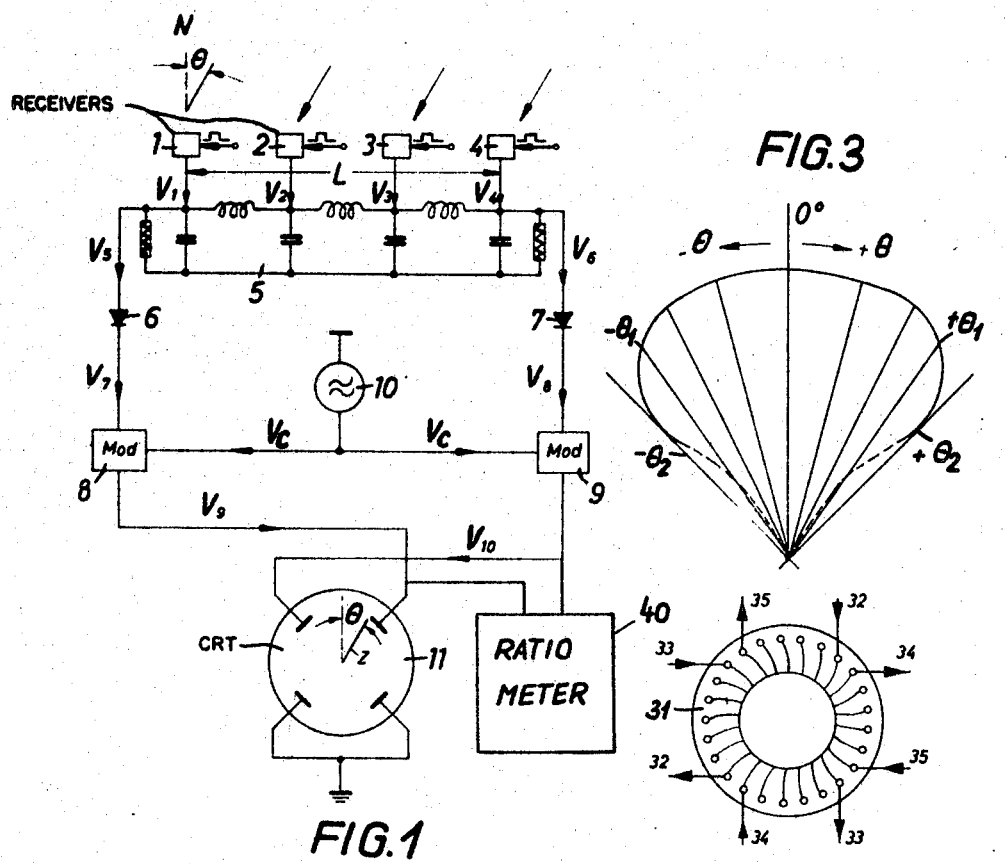

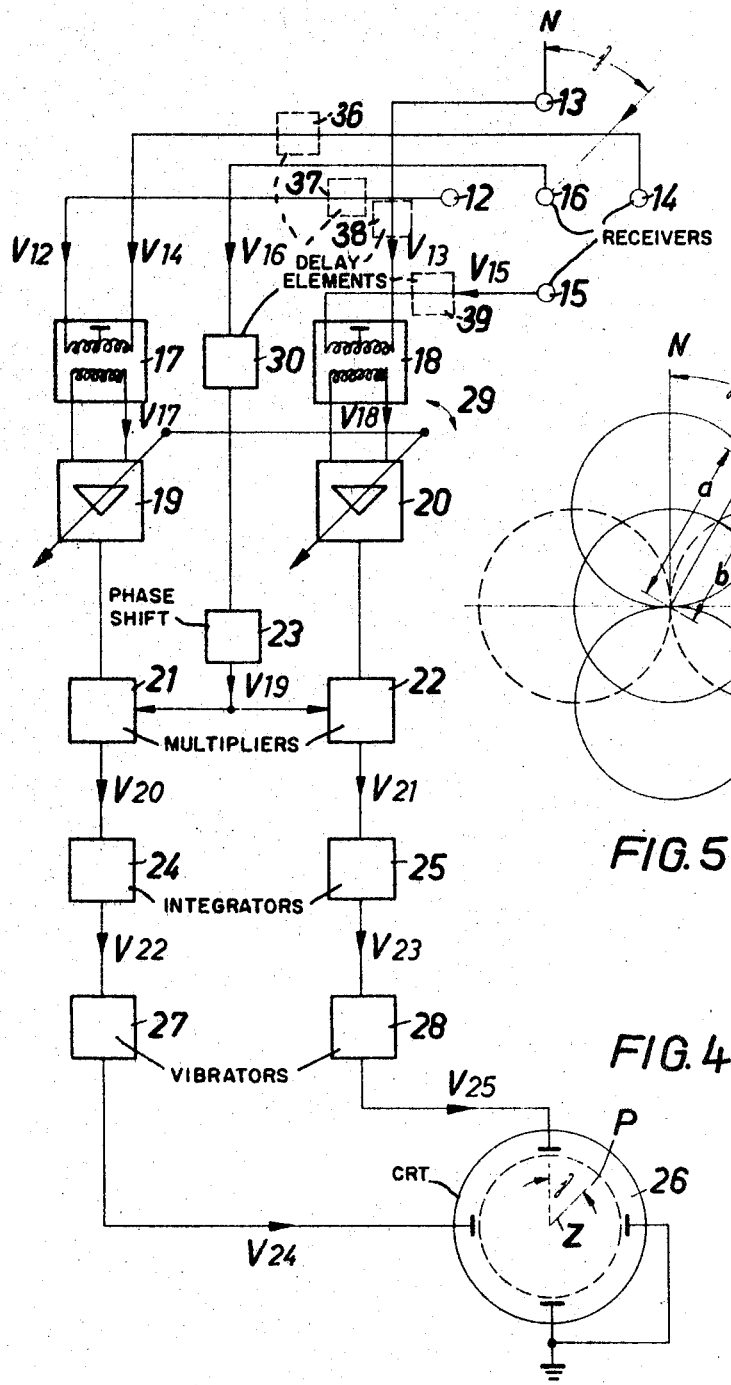

3,464,056
APPARATUS FOR DISPLAYING THE DIRECTION OF INCIDENT PLANE WAVES
Gunter Ziehm, Bremen, Karl-Friedrich Triebold, Bremen-Osterholz, Alfred Schief, Eningen, near Reutlingen, and Reinhard W. Leisterer, Bremen, Germany, assignors to Fried. Krupp Gesellschaft mit beschrankter Haftung, Essen, Germany
Filed Jan. 30, 1968, Ser. No. 701,772
Claims priority, application Germany, Jan. 31, 1967, B 90,967
Int. Cl. H04b 13/00
U.S. Cl. 340—6                     11 Claims

ABSTRACT OF THE DISCLOSURE

Apparatus for visually indicating the direction of propagation of plane waves, particularly sound waves in water, incident on a wave-detecting receiver arrangement. The apparatus includes a receiver arrangement which has two figure-eight-shaped sensitivity characteristics, the axes of symmetry of which form a 90° angle with respect to each other, and a circular shaped sensitivity characteristic. The receiver is operative to produce a first and a second output signal each of which is proportional to the angular value of the incident wave with respect to one of the figure-eight-shaped sensitivity characteristics and a third output signal proportional to the circular sensitivity characteristic. The apparatus also includes means for receiving the three output signals and visually indicating the angle of incidence of the plane waves on the receiver arrangement. This indicating means is operative to produce a fourth output signal which is proportional to the product of the first and third output signals shifted 90° in phase with respect to each other, and to produce a fifth output signal which is proportional to the product of the second and third output signals shifted 90° in phase with respect to each other.

Background of the invention

The present invention relates to an apparatus for displaying the direction of propagation of plane waves, such as sound waves in water, which employs a receiver arrangement for detecting the waves that has two, preferably similarly shaped, sensitivity characteristics having peak sensitivities that are shifted in angle with respect to each other.

Prior art apparatus of the type to which the present invention relates is employed in electronic target detection control for torpedoes. An output signal, obtained from the receiver arrangement, is usually transmitted by wire to a remote control station, and there detected by means of an earphone. The receiver arrangement, made to oscillate periodically, produces maxima in the received signal which correspond to the peak sensitivities of the two sensitivity characteristics; the received signal, which is thus dependent upon the angular orientation of the receiver arrangement, is heard in the earphones and the target control adjusted in a direction corresponding to the minimum received volume occurring between the two maxima. This direction represents the bisection of the angle between the two directions of the peak sensitivities.

It is also known in the prior art to directly display the direction of propagation of detected waves on the screen of a cathode-ray tube. The display is commonly made to appear as a deflection line which emanates radially from the center of the tube in the target or sound source direction. Apparatus of this type operates according to the so-called "sum-difference method"; that is, it displays on the screen of the cathode-ray tube the phase differences of received signals which result from the fact that the waves are detected by different receivers at different times. The sum-difference method is only suitable, however, when used in connection with received waves of a sharply delimited frequency.

Summary of the invention

An object of the present invention is to design an apparatus for displaying the direction of propagation of plane waves which may be employed even when the waves include a broad range of frequencies.

This and other objects which will become apparent in the discussion that follows are achieved, according to the present invention, by means of apparatus including a receiver arrangement of the type described above having two directions of peak sensitivity and which produces a first output signal which is a function of the angle of incidence of the waves detected by the receivers taken with respect to one of the directions of peak sensitivity and a second output signal which is a function of the angle of incidence of the waves detected by the receivers taken with respect to the other direction of peak sensitivity. These two output signals, which may, for example, be measured by their voltage amplitudes, are fed to a cathode-ray tube where they form the deflection signals for the two C.R.T. orthogonal axes.

In a preferred embodiment of the present invention, the two output signals are each first rectified and fed to separate modulators which are also supplied by a common carrier frequency generator. The output signals of each of the modulators, which represent the carrier wave modulated by the output signals of the receiver arrangement, are in turn fed to the respective deflection systems of the cathode-ray tube.

The apparatus according to the present invention is suitable for indicating the direction of propagation both of noises as well as signals having particular frequencies such as those employed with direction-finding apparatus operating according to the pulse reflection method. If the latter technique is employed, the selectivity of the apparatus of the present invention may be increased by sending out pulses having a duration of several wave periods and providing the apparatus with a pulse duration filter which only passes signals having the given pulse width.

To form a receiver arrangement having the prescribed sensitivity characteristics, it is necessary, in general, to use individual receivers or receiver groups arranged in a configuration which extends a distance that is large compared to the wavelength of the sound the direction of propagation of which is to be measured. Apart from the fact that the directionality of such an arrangement is frequency-dependent, there is an additional disadvantage in the fact that, given the error or tolerances with which the direction of propagation is to be determined, the lower the sound frequency, the larger must be the dimensions of the receiver arrangement.

A further object of the present invention, therefore, is to provide apparatus, of the type described above, having a receiver arrangement of small dimensions which is substantially independent of frequencies and makes possible an exact determination of the direction of propagation of low-frequency sound waves.

This as well as other objects which will become apparent in the discussion that follows are achieved, according to the present invention, by employing a cross-shaped receiver arrangement having two sensitivity characteristics, each shaped as a figure eight and displaced, with respect to each other, by 90°, and a third sensitivity characteristic of circular shape. This type of receiver arrangement, like the arrangement of the embodiment described above which operates with the differences in transit time, produces two output deflection voltages for the crossed deflection system of the cathode-ray tube so that a deflection point or line corresponding to the direction of propagation of waves will appear on the screen. The present receiver arrangement is unlike the above described arrangement, however, in that it is independent of frequency and is therefore suitable for sounds having a wide frequency range.

In accordance with a particular feature of the present invention, two multipliers are connected to the outputs of the receiver arrangement in combination with a phase-shifting device which effects a broadband 90° phase shift, such that one multiplier forms the product signal of the signal representing the circular characteristic and one of the signals representing a figure-eight characteristic and the other multipler forms the product signal of the signal representing the circular characteristic and the signal representing the other figure-eight characteristic, this after one of the multiplicands of each of the two multipliers of each of the two multipliers has been shifted in phase by 90°. The two product signals so obtained can, instead of serving as deflection signals for a cathode-ray tube, be supplied to a ratiometer for direct indication of the angular direction of propagation.

According to a further feature of the present invention, two integrators are connected to the outputs of the multipliers to form DC signals from the two product signals. This arrangement is especially useful when the direction of propagation is to be indicated by means of the cathode-ray tube. The integration serves to steady the indicated value and makes it easier to observe on the screen of the C.R.T. Time constants of the integrators are preferably taken to be large compared with the average period of oscillation of the sounds or noises which are received.

It is possible, in addition, to connect two vibrators to the outputs of the two integrators to form oscillating or "chopped" C.R.T. deflection signals from the two DC signals so that the C.R.T. will display a radius vector, instead of a simple point, emanating from the center of the tube screen in the direction of propagation of the received sound waves.

Waves which are typically observed by apparatus of the type disclosed in this application, are sound waves produced by the propeller screws of ships. These sound waves are comprised of broadband noise, plus a superimposed periodic continuous wave or fundamental and its partial tone spectrum. A particularly favorable information/interference ratio may be obtained with noises of this kind if a delay line network having time delay equal to a whole multiple of the period of the fundamental of the received signal is connected to the output of the receiver arrangement. This delay line network is designed to effect a time delay between the "circular signal" and the two "figures eight signals" before the multiplication stage.

It is possible to construct the crossed receiver arrangement, for example, from two pairs of magnetostrictive rods arranged on two lines which cross at an angle of 90°. An especially simple and advantageous receiver arrangement can also be made by winding a magnetostrictive annular vibrator or resonator with four coils, each of which extends over a semicircle and begins at a point 90° from the respective beginning points of the nearest ones of the other coils. Each two oppositely lying coils are oppositely electrically poled; these two opposite pairs thus produce the two figure-eight signals." The "circular signal" is obtained from the series connection of two of the oppositely oriented coils.

Brief description of the drawings

FIGURE 1 is a schematic diagram of apparatus for determining the direction of propagation of sound waves, according to a first embodiment of the present invention.

FIGURE 2 is a cartesian coordinate diagram showing the two sensitivity characteristics of the apparatus of FIGURE 1.

FIGURE 3 is a diagram of the direction-finding display which will occur on the screen of the cathode-ray tube of the apparatus of FIGURE 1.

FIGURE 4 is a schematic diagram of apparatus for determining the direction of propagation of sound waves according to a second embodiment of the present invention.

FIGURE 5 is a diagram showing the three sensitivity characteristics of the apparatus of FIGURE 4.

FIGURE 6 is a plan view of a particular embodiment of a receiver arrangement which may be employed in the apparatus of FIGURE 4.

Description of the preferred embodiments

Referring now to the drawings, there is shown, in FIGURE 1, apparatus according to a first embodiment of the present invention for determining the direction of propagation of sound waves in water. This apparatus operates with a group of receivers arranged in a straight line; the group may consist, for example, of four receivers 1, 2, 3 and 4. The length L of the group is large compared to the wavelength of the sound waves the directions of propagation of which are to be detected and displayed. The receivers 1 to 4 are connected through preamplifiers, not shown, to a delay line network 5; the four received voltages $V_1$, $V_2$, $V_3$ and $V_4$ are thus superimposed on the two outputs of the delay line network producing output voltages $V_5$ and $V_6$.

If the receiver arrangement is to be employed to determine the direction of propagation of sound wave pulses which are sent out from a transmitter in accordance with the pulse reflection or backscatter method, the echoes of the transmitted pulses may be preferably selected or filtered through at the receivers by tuned "pulse width filters" at the inputs shown. This may thus be used to increase the signal-to-noise ratio by excluding sound having the incorrect duration.

The voltages $V_5$ and $V_6$ which appear at the outputs of the delay line network are then rectified by diodes 6 and 7, respectively. The resulting D.C. control voltages $V_7$ and $V_8$ are fed to modulators 8 and 9. The modulators are supplied by an alternating current source 10 with a common carrier frequency voltage $V_c$. The resulting modulated carrier frequency A.C. voltages $V_9$ and $V_{10}$ are allowed to control a ratiometer 40 or the two pairs of orthogonal plates of a cathode-ray tube 11.

The original, natural sensitivity characteristic R of the receivers 1 to 4 appears at the left output of the delay line 5 as an artificial sensitivity characteristic $R_1$ compensated toward the right and at the right output of the delay line as an artificial sensitivity characteristic $R_2$ compensated toward the left. The compensation angles $+\theta_1$ and $-\theta_1$ depend upon the frequency of the received sound waves and the amount of delay in the delay line network 5. If a sound wave of given amplitude falls on the receiver group at an angle $\theta$ from the normal N, the A.C. voltage $V_5$ appearing at the left output will be proportional to the direction factor $a$ of the characteristic $R_1$ which is compensated toward the right, and the A.C. voltage $V_6$ appearing at the right output will be proportional to the direction factor $b$ of the characteristic $R_2$ which is compensated toward the left. The D.C. voltages $V_7$ and $V_8$ which appear at the outputs of the diodes 6 and 7 and control the carrier frequency voltage $V_c$ via the modulators 8 and 9 are directly proportional to the voltages $V_5$ and $V_6$. The resulting voltages $V_9$ and $V_{10}$, fed to the two pairs of deflection plates of the cathode-ray tube 11 are therefore in phase and proportional to the direction factors $a$ and $b$, respectively.

The screen of the cathode-ray tube will therefore display a slanted line Z having an angle $\rho$ with respect to the axis of the pairs of plates which is given by $$\tan \rho = b/a$$

If the waves impinge on the receiver group in the direction of the normal, that is, $\theta=0$, both direction factors $a$ and $b$ will be equal in value and the display line Z on the cathode-ray tube will be oriented 45° with respect to the axis of both pairs of plates.

FIGURE 2 illustrates typical sensitivity characteristics $R_1$ and $R_2$ which may result with an apparatus of the type shown in FIGURE 1. If the waves impinge on the receiver group at an angle $\theta$ from the normal, these sensitivity characteristics will produce direction factors $a$ and $b$, as shown. FIGURE 3 illustrates the C.R.T. display which will result from the sensitivity characteristics shown in FIGURE 2.

FIGURE 4 illustrates apparatus according to a second embodiment of the present invention, which operates in a considerably different manner from the apparatus of FIGURE 1, to determine the positional direction of acoustic signal and noise sources under water. Five broadband sound receivers 12, 13, 14, 15 and 16 are provided to detect the underwater sound waves; the separation of one from the other is small in comparison to the wavelength of the acoustic signals or noises the directions of propagation of which are to be determined. Four of the receivers are arranged in a square; that is, receivers 12 and 14 are arranged on a line which is displaced 90° from the line joining receivers 13 and 15. The receiver 16 is arranged in the middle of the square. It is possible to eliminate the receiver 16 if a device is provided to take the sum of the voltages produced by all four receivers 12 to 15.

The output voltages $V_{12}$ and $V_{14}$ of the two receivers 12 and 14 are supplied to a difference channel 17 and the output voltages $V_{13}$ and $V_{15}$ of the receivers 13 and 15 to a difference channel 18 to produce signals $V_{17}$ and $V_{18}$, respectively, proportional to the difference between each of the two voltage pairs.

The difference signals $V_{17}$ and $V_{18}$ form two figure-eight sensitivity characteristics $R_1'$ and $R_2'$ which are shifted 90° with respect to each other, as shown in FIGURE 5; these signals will therefore be hereinafter referred to as figure-eight signals. These figure-eight signals $V_{17}$ and $V_{18}$ are amplified by two controllable amplifiers 19 and 20 and multiplied by a signal $V_{19}$ in two electronic multipliers 21 and 22. The signal $V_{19}$ is derived from the output of the receiver 16. It represents a circular sensitivity characteristic which has been given a broadband rotation of 90° by a wideband phase shifting network 23. A "Wideband Phase Shifting Network" has been described by R. B. Dome in Electronics, December 1946, p. 112–115.

The product signals $V_{20}$ and $V_{21}$ which are produced by the multipliers 21 and 22, respectively, are fed to integrators 24 and 25. The time constant of these integrators is chosen to be large compared to the duration of periodic variations in the observed noises; that is, for example, large compared to the time between periodic beats caused by the rotation of ship propellers. The integrated product signals $V_{22}$ and $V_{23}$ can be fed directly to the two crossed display systems of a cathode-ray tube 26. If this is done, the tube screen would display a point P since the integrated product signals will be D.C. voltages. The direction of this point P from the middle of the screen would thus represent the direction of propagation of the incident sound waves. If, for example, noise be incident on the receiver group at an angle $\gamma$ from the normal N, as indicated in FIGURE 4, the display point P will also appear on the cathode-ray tube screen at an angle $\gamma$ from one of the tube axes. This display point will be made practically stationary by means of the integration of the integrators 24 and 25; that is, at least as long as the angular direction of the source of noise is not substantially changed.

Since, however, an arrow or line pointing in the angular direction $\gamma$ from the middle of the screen is easier to observe, two vibrators 27 and 28 are connected, in accordance with the present invention, between the integrators 24 and 25 and the cathode-ray tube. These vibrators chop the D.C. voltages $V_{22}$ and $V_{23}$ produced by the integrators at a frequency sufficiently high so that it cannot be observed by the eye.

The deflection signals $V_{24}$ and $V_{25}$ so formed thus produce a line Z on the screen of the cathode-ray tube which runs from the middle of the screen out to the end point P, which would have been produced with the D.C. display, at an angle $\gamma$ taken from one of the axes of the screen. The length of the line can be controlled by hand by means of a potentiometer 29 which simultaneously adjusts the gain of the two amplifiers 19 and 20. The line length can also be maintained at a constant prescribed value by employing automatic control devices of the type will known in the art.

For sound or noise sources producing a partial tone spectrum, as, for example, do the propellers of ships, a particularly favorable information-to-interference ratio may be obtained, according to a particular feature of the present invention, by inserting a delay line in the circuit between the receivers 12 and 14 and the difference channel 17 and the circuit between the receivers 13 and 15 and the difference channel 18. The transit time for these delay lines should correspond to the period or a whole multiple of the period of the fundamental of the signal detected by the receivers. The term "fundamental," as used here, should be understood to mean the fundamental tone or line of the superimposed line spectrum. These delay lines are indicated in FIGURE 4 by dashed lines and designated 36, 37, 38 and 39.

Since the two multipliers 21 and 22 correlate the sum signal obtained from the receiver 16 and the two difference signals of the two crossed groups of receivers, it is clear that, as a result of the delay, the broadband random noise will no longer be correlated. The tones in the signal, however, will correlate because the correlation functions sharply rises again after a delay equal to the period of the fundamental.

It is also possible to insert the delay in the channel between the receiver 16 and the 90°-element 23. This delay is shown in solid lines and designated with the number 30 in FIGURE 4.

FIGURE 6 illustrates a particular embodiment of a receiver configuration suitable for use with the apparatus of FIGURE 4. Whereas the receiver groups in FIGURE 4 which form the cross arrangement consist of five individual receivers, formed, for example, by five separate magnetostriction rods, the cross arrangement in FIGURE 6 consists of a single magnetostrictive annular resonator 31 with four windings 32, 33, 34 and 35. These windings each extend over a semicircle and begin at points which are separated 90° with respect to each other. Each two oppositely oriented windings, that is, 32 and 34, or 33 and 35, are arranged with opposite polarity; they produce the two figure-eight signals $R_1'$ and $R_2'$ at their respective outputs. The circular signal $R_3$ may be obtained from the output of two oppositely lying windings, for example, 32 and 34, connected in series.

It will be understood that the above description of the present invention is susceptible to various modifications, changes and adaptations. It is possible, for example, to insert bandpass filters in the individual channels of the apparatus which forms the present invention in order to pass frequency bands which are of special interest.

We claim:
1. A device for indicating the direction of propagation of plane waves comprising, in combination:
  (a) receiver means for detecting the waves and having two figure-eight-shaped sensitivity characteristics the axes of symmetry of which form a 90° angle with respect to each other, and a circular-shaped sensitivity characteristic, said receiver means including means for producing a first output signal proportional to the value of one of said figure-eight shaped sensitivity characteristics at which the angle of incidence of said waves on said receiver means taken with respect to the corresponding one of said axes, means for producing a second output signal which is proportional to the value of the other of said figure-eight-shaped sensitivity characteristics at the angle of incidence of said waves on said receiver means taken with respect to the respective other of said axes and means for producing a third output signal which is proportional to said circular sensitivity characteristic; and (b) means, connected to receive said three output signals, for visually indicating the angle of incidence said waves on said receiver means, said indicating means comprising means for producing a fourth output signal which is proportional to the product of said first and said third output signals shifted 90° in phase with respect to each other and for producing a fifth output signal which is proportional to the product of said second and said third output signals shifted 90° in phase with respect to each other.

2. The device defined in claim 1, wherein said first, said second and said third output signals are voltage signals.

3. The device defined in claim 1, wherein said indicating means includes a cathode-ray tube having two deflection axes.

4. The device defined in claim 1, wherein said indicating means includes a ratiometer.

5. The device defined in claim 1, wherein said plane waves are sound waves propagating in water.

6. The device defined in claim 1, wherein said receiver means further includes pulse width filter means for selectively detecting waves having a prescribed pulse width, thereby to selectively detect reflected waves transmitted according to the pulse reflection method.

7. The device defined in claim 1, wherein said indicating means comprises integrating means connected to receive said fourth and said fifth output signals for forming sixth and seventh D.C. output signals from said fourth and said fifth signals respectively.

8. The device defined in claim 7, wherein said indicating means comprises vibrator means connected to receive said sixth and seventh output signals for forming chopped eighth and ninth output signals from said sixth and seventh output signals, respectively, and cathode-ray tube means connected to receive said eighth and ninth output signals for displaying the direction of propagation of said waves.

9. The device defined in claim 7, wherein said waves include a noise component and periodically vary in amplitude and wherein the time constant of said integrating means is large compared to the average period of said amplitude variation of said waves.

10. The device defined in claim 1, wherein said waves include a fundamental tone and wherein said indicating means comprises means for shifting said first and said third output signals by a given time with respect to each other and for shifting said second and said third output signals by said given time with respect to each other, where said given time is equal to the period of said fundamental or a whole multiple thereof.

11. The device defined in claim 1, wherein said receiver means includes an annular magnetostrictive resonator having four windings, said windings being arranged so as to begin at four points on said resonator, each separated from two adjacent ones of said points by 90°, and to extend around a 180° arcuate portion of said resonator, whereby the two pairs of oppositely lying windings, when oppositely poled, provide said two figure-eight sensitivity characteristics and the series connection of two oppositely lying windings provides said circular sensitivity characteristic.

References Cited
UNITED STATES PATENTS

| 2,214,342 | 9/1940 | Neufeld | 343—119 X |
| 2,867,788 | 1/1959 | Harry | 340—6 |
| 3,061,831 | 10/1962 | Fromm | 343—121 |
| 3,176,262 | 3/1965 | Ehrlich et al. | 340—6 X |

RICHARD A. FARLEY, Primary Examiner

U.S. Cl. X.R.

340—16; 343—119

PO-1050
(5/69)

UNITED STATES PATENT OFFICE
CERTIFICATE OF CORRECTION

Patent No. 3,464,056      Dated August 26th, 1969

Inventor(s) Günter Ziehm, Karl-Friedrich Triebold, Alfred Schief and Reinhard W. Leisterer It is certified that error appears in the above-identified patent and that said Letters Patent are hereby corrected as shown below:

Column 1, line 11, change "B 90,967" to --B 90,969--.
Column 3, line 18, delete "of each of the two multipliers".
Column 6, line 13, change "will" to --well--.

SIGNED AND
SEALED
JAN 20 1970

(SEAL)
Attest:

Edward M. Fletcher, Jr.
Attesting Officer

WILLIAM E. SCHUYLER, JR.
Commissioner of Patents